United States Patent [19]

Hollowed et al.

[11] Patent Number: 4,977,592

[45] Date of Patent: * Dec. 11, 1990

[54] DISPENSER AND UNLATCHING MECHANISM FOR A HAND-HELD PAY STATION TELEPHONE

[75] Inventors: Edward J. Hollowed, Naperville; Jerome L. Oldani, Aurora, both of Ill.

[73] Assignee: GTE Airfone Incorporated, Oak Brook, Ill.

[ * ] Notice: The portion of the term of this patent subsequent to Oct. 23, 2007 has been disclaimed.

[21] Appl. No.: 278,391

[22] Filed: Feb. 27, 1989

[51] Int. Cl.5 ...................... H04M 1/11; H04M 17/02
[52] U.S. Cl. ................................... 379/428; 399/144; 399/455; 399/58
[58] Field of Search ............... 379/144, 155, 143, 428, 379/455, 58, 59

[56] References Cited

U.S. PATENT DOCUMENTS 4,811,387 3/1989 Hollowed et al. ................... 379/144

Primary Examiner—Stafford D. Schreyer

[57] ABSTRACT

In conjunction with a hand-held, credit-card telephone for use aboard, for example, commerical aircraft, a telephone dispenser and credit-card unlatching mechanism ("CCUM"). The dispenser includes a dispenser channel of generally longitudinal stepwise construction. The dispenser also includes an outer cover affixed substantially over the dispenser channel and a face plate secured to a first end of the outer cover. A latch plate is secured to a second end of the dispenser channel, so that the dispenser channel, the outer cover, the face plate, and the latch plate, in cooperation, define a telephone-receiving cavity in which a hand-held telephone is secured when not in use. The face plate includes an opening providing access to the telephone-receiving cavity and a slot for the insertion of a credit card. The CCUM itself includes a latch plate secured to the dispenser channel. A latching mechanism is secured to the latch plate and is operated to selectively, in response to the insertion of a credit card into the slot, latch or unlatch the hand-held telephone from the telephone-receiving cavity. The hand-held telephone is withdrawn and replaced into the dispenser through the opening on the face plate.

30 Claims, 3 Drawing Sheets

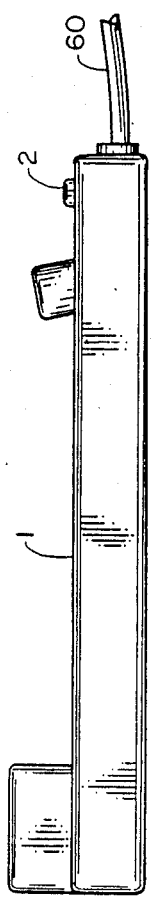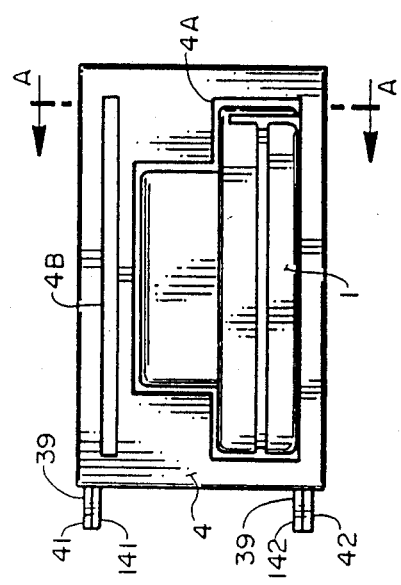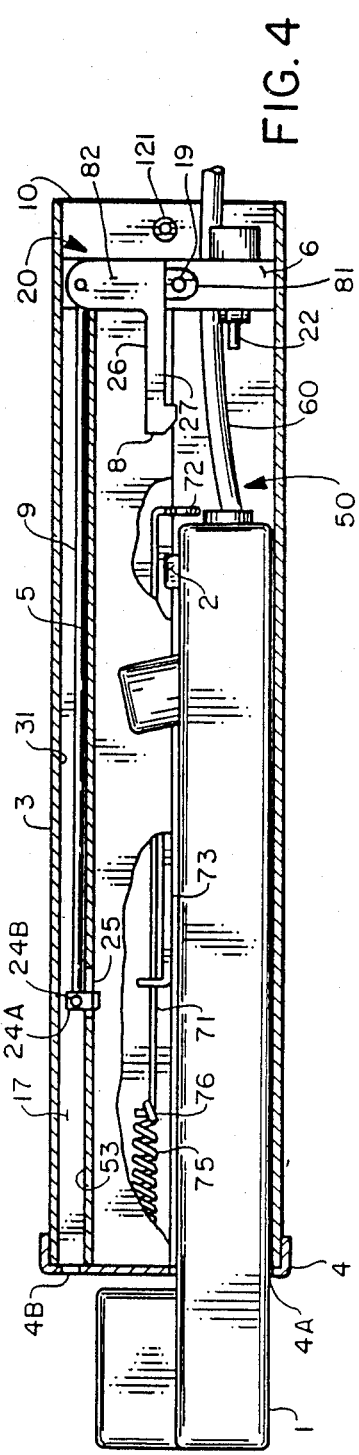

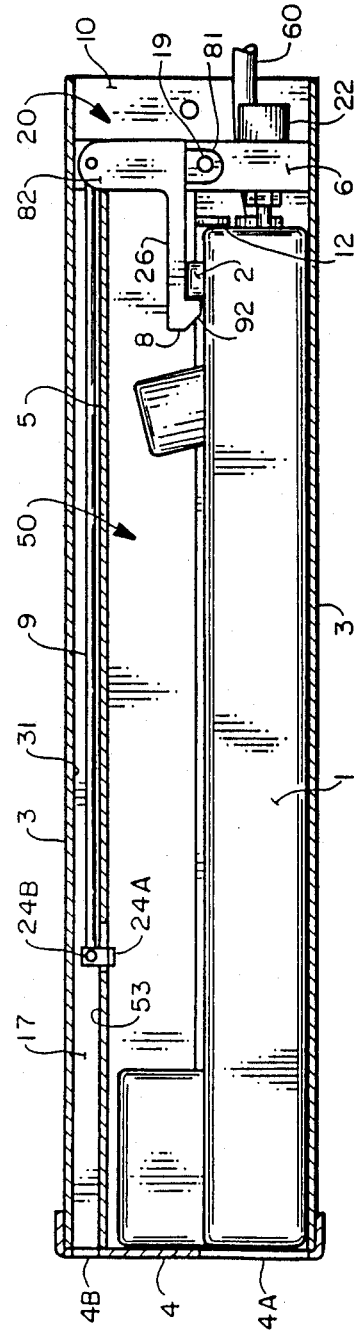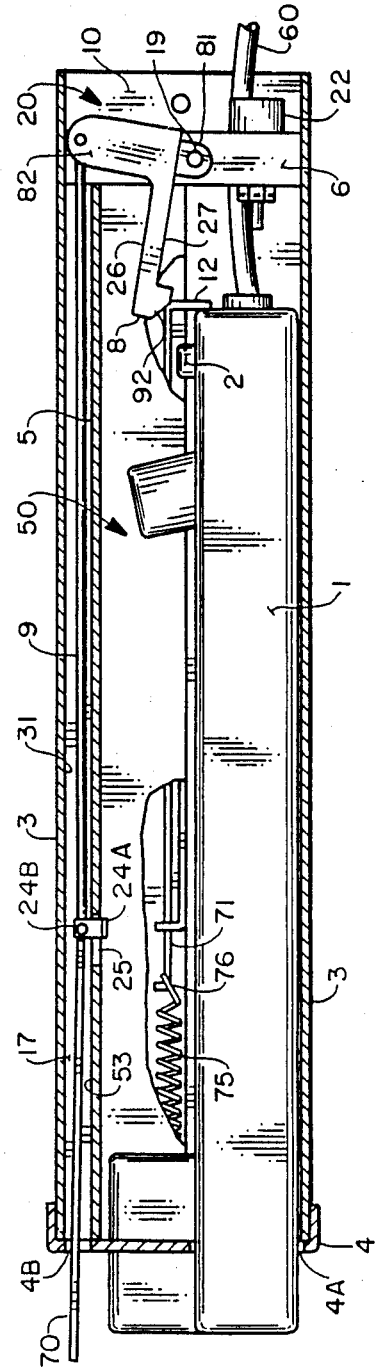

DISPENSER AND UNLATCHING MECHANISM FOR A HAND-HELD PAY STATION TELEPHONE

CROSS REFERENCE TO RELATED APPLICATIONS

Cross Reference is made to the related U.S. Patent Applications entitled: "Holder and Credit-Card Unlatching Mechanism for a Hand-Held Telephone", application Ser. No. 138,182, filed Dec. 28, 1987 U.S. Pat. No. 4,811,387; and, "Hand-Held Pay Telephone and Holder", application Ser. No. 138,172, filed Dec. 28, 1987 U.S. Pat. No. 4,881,254; and, "Pay Station Telephone and Dispenser for a Commercial Conveyance", Ser. No. 278,392; and, "A Hand-Held Pay Station Telephone Dispenser and Cord Retractor", Ser. No. 278,393, the latter two applications filed on the same date, and by the same inventors as this Application.

1. Field of the Invention

The present invention relates to the field of telephone pay stations and, more particularly, to a telephone dispenser and unlatching mechanism adapted for use with a pay station telephone mounted in the passenger area of a vehicle such as a commercial aircraft.

2. Background of the Invention

Public pay telephones were introduced in the 1980s. In general, operation of such pay telephones required the deposit of a coin in order to unlock some mechanism, for example, the crank with which the user signalled the operator or a sliding door in front of the mouthpiece. On occasion, the entire telephone was enclosed in a locked box that could be opened only with the deposit of a coin, or a key. One arrangement reversed the usual scheme and enclosed the telephone in a booth having a door that locked behind the telephone user. After having made his call, the user could escape only by depositing a coin in the doorlock. Only rarely did the early arrangements provide any means for refunding the user's payment in the event that the call could not be completed. An early attempt to remedy this difficulty relied on nothing more than a piece of string.

For many years, the common form of telephone pay station included several slots for the deposit of coins of varying denominations. A typical arrangement allowed the deposit of nickels, dimes and quarters so that payment of various amounts could be utilized in connection with the pay station. This arrangement was first used with so-called manual telephones in which often the initial deposit of a single coin worked to signal the operator that a call was sought to be placed. Additional coins were added for payment of calls of longer duration or for calls to long-distance locations. Internal arrangements of gongs transmitted various sounds back to the operator and gave the operator an indication of proper coin deposit.

Ultimately, telephone pay stations became dial operated, and an operator would normally not be required in order to place local calls. Various arrangements for actuating the equipment and for accepting and returning coins were developed, including, ultimately, electronic totalizers that were able to count and accurately register the number and denomination of coins deposited. Such totalizers also facilitated the development and utilization of so-called single-slot pay stations, wherein a single slot accepted coins of various denominations, eliminating the traditional three-slot design that had been utilized for many years.

Pay telephones that accept credit cards represent a much more recent development that has found widespread use within the past decade. Such arrangements, typically found in airports, railroad stations, etc., have been well received by business travelers, largely because credit-card telephones mitigate the need to carry the many coins required to place telephone calls, particularly long-distance calls.

In the United States today, more people use public telephones more often than in any other country in the world, and the subsequent installation and adaptation of public telephones to different environments have been limited only by the imagination. As a result, significant experimentation has been done in connection with the deployment of pay telephones in other than conventional environments. The deployment of telephone pay stations on railcars, particularly on deluxe passenger trains, has been experimented with from time to time. However, the most recent development and adaptation of the pay station have permitted use in commercial aircraft. Credit-card-accepting pay stations have been incorporated into commercial aircraft where, by means of radio-telephone links, telephone service can be had by the user from the commercial aircraft to ground-based telephone equipment.

With regard to the placement of telephone pay stations on board commercial aircraft, the telephones themselves have typically been installed on bulkheads located adjacent to flight-attendant stations. This arrangement requires the user to leave his seat to go to the location of the on-board pay station to initiate the call. If the pay station is equipped with a wireless telephone unit, the flight attendant often becomes involved in providing the user with the hand-held telephone. Such arrangements fail to afford the convenience, and perhaps the privacy, that an aircraft passenger might desire in connection with the placement of a call.

Accordingly, it is an object of the present invention to provide a new and more effective telephone pay station for use on board in-flight commercial aircraft or in similar other vehicular environments where convenience of utilization and ready access facilitates and encourages use of such pay telephones.

DISCLOSURE OF THE INVENTION

The above and other objects, advantages, and capabilities are realized in conjunction with a hand-held, credit-card telephone for use aboard, for example, commercial aircraft, by a telephone dispenser and credit-card unlatching mechanism ("CCUM").

The dispenser includes a dispenser channel of generally longitudinal stepwise construction. The dispenser also includes an outer cover affixed substantially over the dispenser channel and a face plate secured to one end of the outer cover. A latch plate is secured to a second end of the dispenser channel so that the dispenser channel, the outer cover, the face plate, and the latch plate, in cooperation define a telephone-receiving cavity, in which a hand-held telephone is secured when not in use. The face plate includes an opening providing access to the telephone-receiving cavity and a slot for the insertion of a credit card.

The CCUM itself includes a latch plate secured to the dispenser channel. A latching mechanism is secured to the latch plate and is operated to selectively, in response to the insertion of a credit card into the slot, latch or unlatch the hand-held telephone from the telephone-receiving cavity. The hand-held telephone enters and exits the dispenser through the opening on the face plate.

BRIEF DESCRIPTION OF THE DRAWINGS

A better understanding of the invention may be had from the consideration of the following detailed description taken in conjunction with the accompanying drawings in which:

FIG. 2 is a perspective view of a hand-held pay station telephone, in accordance with the present invention.

FIG. 3 is a front plan view of the telephone dispenser, in accordance with the present invention.

FIG. 4 is a sectional view taken along lines A—A of FIG. 2, showing the installation of the hand-held pay station telephone in the telephone dispenser, in accordance with the present invention.

FIG. 5 is a sectional view taken along lines A—A of FIG. 2, showing the hand-held pay station telephone received and latched within the telephone dispenser, in accordance with the present invention.

FIG. 6 is a sectional view taken along lines A—A of FIG. 2, showing the unlatching and extraction of the hand-held pay station telephone from the telephone dispenser, in accordance with the present invention.

DESCRIPTION OF A PREFERRED EMBODIMENT

Figure 1:
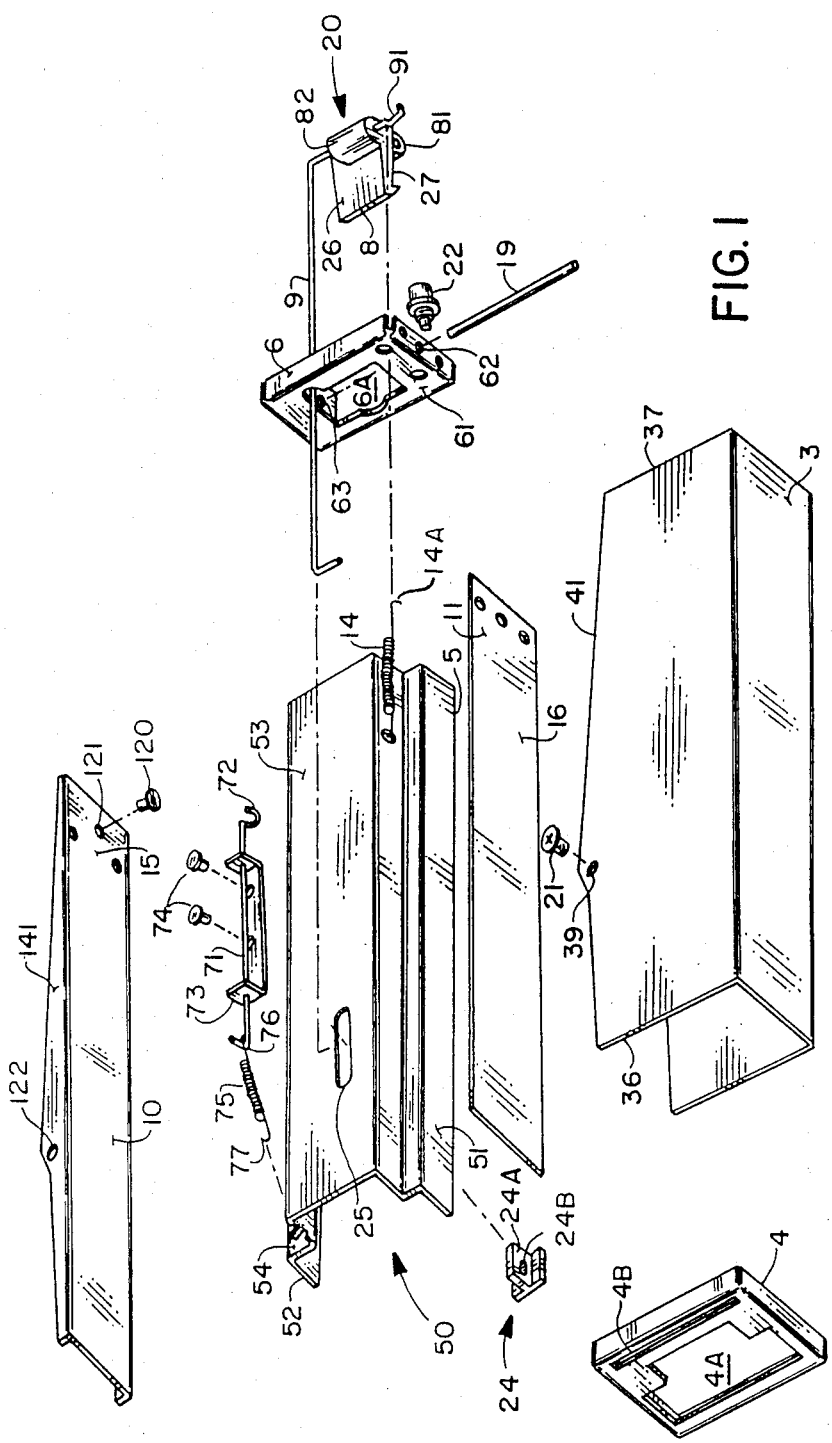
FIG. 1 is an exploded perspective view of a hand-held pay station telephone and its associated telephone dispenser, in accordance with the present invention.

Directing attention first to FIG. 1 and to FIG. 2, depicted therein are a hand-held pay station telephone and its associated telephone dispenser as contemplated in the present invention. Pay station telephone or telephone 1 is of essentially unitary construction and is intended for hand-held operation. The telephone incorporates the familiar telephone functional components, including a transmitter, a receiver, a calling device and a line-matching network. However, inasmuch as the telephone and its incorporated components are not deemed to be constituent elements of the present invention, they will not be discussed in detail.

Also provided at one end of the telephone, as may be seen in FIG. 1, is a latch-receiving flange 2. (In a manner that will be made clear below, latch-receiving flange 2 operates in conjunction with a latching mechanism 20 to secure the telephone in the telephone dispenser when the telephone is not in use.)

Referring now to FIGS. 1 through 4, inclusive, the telephone dispenser for the above-described telephone will now be described in detail. As may be seen from the exploded perspective view of FIG. 1, the telephone dispenser of the present invention is of a generally rectangular configuration and includes a face plate 4 fabricated from a relatively thin plate of metal, plastic, or similar material As can be readily seen in FIG. 3, face plate 4 exhibits a central opening 4A having length and width dimensions appropriate for the insertion of telephone 1 therein. The telephone may be inserted through central opening 4A into a telephone-receiving cavity 50 for retention when the telephone is not in use.

Also included in face plate 4 is a second opening or slot 4B dimensioned so as to permit the insertion of a typical credit card. As will be described in detail below, the insertion of a credit card through opening 4B releases the latching mechanism, thereby facilitating the removal of the telephone from the telephone dispenser. The face plate 4 is attached to a first minor side 36 of outer cover 3.

With renewed reference to FIG. 1, the telephone dispenser of the present invention further includes a dispenser channel 5 of a generally longitudinal, stepped construction. Pertinent to its stepped construction, channel 5 provides a multifaceted profile, which closely conforms to the profile of opening 4A of face plate 4. As can be seen in FIG. 4, channel 5 provides a telephone-receiving cavity 50 for telephone 1 when the telephone is inserted through opening 4A.

In accordance with the present invention, the telephone-receiving cavity 50 for telephone 1 is further defined by means of a latch plate 6. Latch plate 6 includes a face surface 61 disposed in a plane that is parallel to the plane of face plate 4 and is orthogonal to the longitudinal direction of channel 5.

Included in latch plate 6 is a hook switch 22. The hook switch 22 is spring loaded and is operated to the electrically open or "on-hook" position in response to the placement of a telephone 1 within the telephone-receiving cavity 50. When the telephone is removed from the telephone-receiving cavity 50, the spring-loaded hook switch 22 operates to electrically connect the telephone, via the telephone line cord 60, to the associated telephone equipment.

As can be seen in FIGS. 1 and 4, the telephone-receiving cavity 50 is formed by channel 5, latch plate 6 and one major side of outer cover 3. Latch plate 6 is orthogonally mounted between similar end portions 15 and 16 of a first and a second mounting bracket 10 and 11, respectively. The first mounting bracket 10 is further mounted to outer surface 52 of channel 5 and the second mounting bracket 11 is mounted to an opposite surface 51 using any convenient and appropriate means of attachment such as rivets or screws. As can be best seen in FIG. 1, a subassembly consisting of channel 5 sandwiched between brackets 10 and 11 and latch plate 6 has the outer cover 3 installed over the subassembly and secured with fasteners 21 which fix the outer cover 3 to the first mounting plate 10.

A latch mechanism 20 is pivotally mounted to the latch plate 6 by means of a latch pivot rod 19. In a preferred embodiment, latching mechanism 20 includes generally rectangular top and bottom major surfaces 26 and 27, respectively, and a latching arm 8. A pivot-rod-accepting eyelet member 81 extends transversely along bottom surface 27. As can be seen at FIG. 1, the pivot rod 19 is inserted through a rod-mounting hole 62, located on one side of latching plate 6, then through eyelet member 81 and finally through a similar rod-mounting hole 63 on an opposite side of latch plate 6. As can be readily appreciated, pivot rod 19 secures the latching mechanism 20 to latching plate 6. When properly mounted, latching mechanism 20 is positioned so as to extend latching arm 8 through opening 6A and into the rear portion of the telephone-receiving cavity 50.

The latching mechanism 20 further includes an eyelet member 82 extending transversely along upper surface 26. Eyelet member 82 is arranged to accept thereinto one end of a latch-release rod 9. As shown in FIGS. 1 and 4, latch-release rod 9 extends through an opening 6A of latch plate 6 and into a cavity 17 formed by an inner surface 31 of outer cover 3 and outer surface 53 of channel 5. Surface 53 of dispenser channel 5 includes a longitudinally oriented opening 25 having a first arm 24a of a generally T-shaped latch release actuator 24 extending substantially through opening 25. An aperture 24b extending through the first arm 24a of actuator 24 accepts a second and opposite end of latch-release rod 9. As can be seen in FIG. 4, latching mechanism 20 is mechanically connected to release actuator 24 via latch-release rod 9.

The latching mechanism 20 is maintained in the closed or latched position by means of an attached, elongated coil spring 14. Spring 14 is attached, at one end, to the side of channel 5 by any convenient fastening device or method. Spring 14 is attached at another end to latch-release rod 9 which extends from eyelet member 82. A hamate extension 14a of spring 14 engages and attaches to end 91 of latch-release rod 9. Elongated coil spring 14, including hamate portion 14a, form a retention mechanism for predisposing the orientation of latching mechanism 20 so that latching arm bracket 8 is positioned to interlockingly engage the latch-receiving flange 2 of telephone 1.

Also affixed to the channel 5 is an ejector mechanism that consists of an ejector push-rod 71 secured to dispenser channel 5 via a U-shaped bracket member 73. Bracket member 73 may be mounted to surface 54 of dispenser channel 5 by employing any one of the many common mounting techniques known in the art, such as the rivets 74 shown in FIG. 1. One end of the ejector push-rod 71 is formed into an ejector pin 72 which projects through an ejector aperture (not shown) in channel 5. Ejector pin 72 extends orthogonally to ejector push-rod 71 and is positioned to abut the rear portion of telephone 1 when the telephone is secured within the cavity. An opposite end of ejector push-rod 71 is attached to one end 76 of ejector spring 75. An opposite end 77 of ejector spring 75 is attached to dispenser channel 5. The ejector mechanism (specifically, push-rod 71 and ejector pin 72) operate to urge, in response to the insertion of a credit card by the telephone user, the telephone 1 in a direction out of the telephone-receiving cavity 50.

The telephone dispenser of the present invention may be installed in the vicinity of an aircraft seat, bulkhead or similar environment, or perhaps in seats such as those included in limousines, boats, trains, and the like. Obviously, the particular technique of mounting the telephone dispenser, particularly by means of attaching the dispenser to the surrounding mounting environment, will vary substantially depending upon the particular utilization of the present arrangement. Thus, the specific details of mounting the telephone dispenser to the surrounding environment will not be dwelled upon, inasmuch as such mounting details may be readily arrived at by a practitioner of ordinary skill equipped with the description herein provided.

A more thorough understanding of the present invention may be had by means of the following description, which shall be offered again in conjunction with the above-described drawings. Particular attention will presently be directed to the manner in which the telephone is placed into the telephone dispenser, latched and retained in the telephone-receiving cavity 50, and then released for use by a telephone user.

With the telephone in the user's hand, the line cord 60 will extend from the telephone 1 into the telephone-receiving cavity 50 and will exit the cavity by means of opening 6A in latch plate 6. As can be seen in FIG. 4, the user inserts the end of the telephone that includes the line cord into the telephone dispenser by placing the telephone through opening 4A of face plate 4. The line cord 60 will be drawn through by means of an associated cord or takeup, reel (not shown). The telephone is then manually urged into the dispenser through opening 4A of face plate 4 and into the telephone-receiving cavity 50. As the telephone travels within the telephone-receiving cavity 50, the cord end of the telephone contacts the ejector pin 72. Any further movement of the telephone toward the latching mechanism 20 causes the ejector pin 72 and the push-rod 71 to follow the telephone's movement, thereby tensioning ejector spring 75. Adequate pressure of the telephone latch-receiving flange 2 against the spring-loaded latching mechanism 20, specifically, against inclined edge 92 of latching arm 8, will initially cause the latching mechanism 20 to pivot in a direction that causes latching arm 8 to pivot upward some distance from the latch-receiving flange 2 and to ride over the top surface of latch-receiving flange 2. As the telephone is further inserted into the telephone-receiving cavity 50, latching arm 8 will fall off the latch-receiving member 2 top surface. At this point, coil spring 14 will pull latching arm 8 downward, locking latching arm 8 against latch-receiving flange 2. As can be seen in FIG. 5, the telephone is held securely against the latching mechanism 20 by a tension force supplied by spring 75 to ejector push-rod 71 and ejector pin 12. The telephone is thereby retained in its associated telephone dispenser, ready for subsequent use.

Now with reference to FIG. 6, an explanation of the extraction of the telephone from the dispenser will be given. Should a telephone user desire to use the telephone, he would insert a credit card 70 through the opening 4B in face plate 4. Once inserted through opening 4B, the credit card will then pass into cavity 17 and be guided in the direction of the first arm 27 of latch-release actuator 24. Moderate exertion by the user against the credit card 70 forces the latch-release actuator back, thereby overcoming the spring tension maintained by spring 14. As a result, latching mechanism 20 is caused to rotate about pivot rod 19, causing latching arm 8 to pivot upward, disengaging latching arm 8 from latch-receiving flange 2. At this point, ejector pin 72, will be forced in a forward direction against the rear portion of telephone 1, thereby causing the telephone to be forced forward and to protrude from opening 4A of the dispenser. That is to say, ejector spring 75 is so tensioned that ejector pin 72, via ejector push-rod 71, delivers pressure to the telephone in a direction that, absent the opposing force applied by the latching arm 8, urges the telephone out of the dispenser. The user may now grasp the telephone and manually withdraw it from the telephone dispenser.

By means of a credit-card reader that may be included in the telephone, the user obtains access to the associated telephone system. A pushbutton calling device included in the telephone permits the user to secure a connection with the desired telephone station. The particular details of the operation of the telephone itself to secure the telephone connection do not form a part of the present invention and, therefore, will not be described in more elaborate detail.

It is, however, useful to underscore some of the salient attributes of the subject Dispenser and Unlatching Mechanism. Its compact design and low-profile form factor permit installation, for example, under the armrests of seats of crowded commercial vehicles, where space is at a premium. A more bulky and cumbersome outline would likely militate against such convenient installation and discourage use of the on-board pay telephone. The compact design of the CCUM itself significantly contributes to the objective of providing a low-profile, readily installed apparatus. In addition, the credit card actuator CCUM, of the pay station telephone guards against the inadvertent release of the telephone handset in the cramped quarters typical of, for example, a commercial airliner.

Furthermore, it will be obvious to those skilled in the art that numerous modifications to the present invention can be made without departing from the scope of the invention as defined by the appended claims. In this context, it should be recognized that the essence of the invention resides in a low-profile, easily installed dispenser that defines a receiving cavity for a hand-held telephone. A CCUM, disposed in proximity with the dispenser, operates to secure a telephone in the cavity and requires the insertion of a credit card to release the telephone. The CCUM design comports with the low-profile, easily installed dispenser configuration.

We claim:

1. For a on a armrest retainable hand-held pay telephone, a dispenser and credit-card unlatching mechanism ("CCUM") comprising:
   (a) dispenser means for defining a telephone-receiving cavity (50) for the placement of a hand-held telephone, said dispenser means comprising:
      a dispenser channel (5) of generally longitudinal, stepped construction;
      an outer cover (3) secured over said dispenser channel;
      a face plate (4) including an opening for access to said telephone-receiving cavity (50) attached to a first minor end of said outer cover; and,
      a latch plate (6) secured to a second minor end of said dispenser channel and proximate to a second minor end of said cover; and,
   (b) a CCUM attached to said latch plate for selectively latching and unlatching a hand-held telephone in the telephone-receiving cavity 50 in response to predetermined actions undertaken by a telephone user.

2. A dispenser and CCUM as defined in claim 1, wherein the CCUM comprises:
   a latching mechanism pivotably attached to the latching plate (6), said latching mechanism including (i) top and bottom major surfaces, (ii) a latch-release-rod-accepting member (82) extending transversely across said top major surface, (iii) a latch-release rod (9) having a first end attached to said latch-release-rod-accepting member, and (iv) a latching arm (8) extending at a right angle to said bottom major surface, said latching arm adapted to interlockingly engage a latch-receiving flange (2) on said hand-held telephone; and
   a latch-release actuator (24) attached to said dispenser channel, said latch-release actuator attached to an end of said latch-release rod opposite the first end and located proximate a vertical slot in said face plate, said vertical slot for permitting the insertion of a credit card in the direction of the latch-release actuator.

3. A dispenser and CCUM as defined in claim 2, wherein said dispenser channel and said outer cover define a credit-card-accepting cavity therebetween, said credit-card-accepting cavity providing an elongated compartment generally conformal to the profile of a credit card for guiding the travel of a credit card between said vertical slot and said latch-release actuator.

4. A dispenser and CCUM as defined in claim 3, wherein the CCUM further comprises retention means coupled between said dispenser channel and said latching mechanism for predisposing the orientation of said latching mechanism so that said latching-arm is positioned for engagement to the latch-receiving flange.

5. A dispenser and CCUM as defined in claim 4, wherein said retention means comprises:
   an elongated coil spring affixed at one end to said dispenser channel; and
   a hamate portion integral to and extending at another end of said coil-spring, said hamate portion affixed to an end portion of said latch-release rod extending from said latch-release rod accepting member.

6. A dispenser and CCUM as defined in claim 5, further comprising an ejector mechanism extending into a rearward area of said dispenser channel for urging, in response to telephone-user activity, a hand-held telephone in a direction out of said telephone-receiving cavity.

7. A dispenser and CCUM as defined in claim 6, wherein said ejector mechanism consists essentially of (i) an ejector push-rod (71) slidably mounted in an ejector bracket (73), said ejector bracket attached to an exterior surface of said dispenser channel, (ii) an elongated spring (75) affixed at a first end to a forward portion of said dispenser channel and at a second end to a first end of said ejector push-rod, and (iii) an ejector pin (72) formed on a second end of said ejector push-rod, said ejector pin adapted to extend from an ejector aperture in the dispenser channel, wherein the elongated spring is tensioned to cause the ejector pin to apply pressure to said hand-held telephone in a direction that urges the telephone out of said telephone-receiving cavity.

8. A dispenser and CCUM as defined in claim 1, wherein there is further included an ejector mechanism extending into a rearward area of the dispenser channel for urging, in response to telephone-user activity, said hand-held telephone in a direction out of said telephone-receiving cavity.

9. A dispenser and CCUM as defined in claim 8, wherein the CCUM comprises:
   a latching mechanism pivotably attached to said latching plate (6), said latching mechanism including (i) top and bottom major surfaces, (ii) a latch-release push-rod accepting member (82) extending transversely across said top major surface, (iii) a latch-release push-rod (9) having a first end attached to said latch-release push-rod accepting member, and (iv) a latching arm (8) extending at a right angle from said bottom major surface, said latching arm adapted to disengage from a latch-receiving flange (2) on a hand-held telephone; and,
   a latch-release actuator (24) attached to said dispenser channel, said latch-release actuator attached to a second end of said latch-release push-rod, said latch-release actuator located proximate a vertical slot in said face plate, said vertical slot for permitting the insertion of a credit card in the direction of the latch-release actuator.

10. A dispenser and CCUM as defined in claim 9, wherein said dispenser channel and said outer cover define a credit-card-accepting cavity therebetween, said credit-card-accepting cavity providing an elongated compartment generally conformal to the profile of a credit card for guiding the travel of a credit card between said face plate vertical slot and said latch-release actuator.

11. A dispenser and CCUM as defined in claim 10, wherein the CCUM further comprises retention means coupled between said dispenser channel and the latching mechanism for predisposing the orientation of the latching mechanism so that the latching arm is positioned for the disengagement from said latch-receiving flange of said hand-held telephone.

12. A dispenser and CCUM as defined in claim 11, wherein the retention means comprises:
an elongated coil spring affixed at one end to said dispenser channel; and
a hamate portion integral to and extending at another end of said coil-spring, said hamate portion affixed to an end portion of said latch-release rod extending from said latch-release rod accepting member.

13. A dispenser and CCUM as defined in claim 12, wherein said dispenser further includes an ejector mechanism and said ejector mechanism consists essentially of (i) an ejector rod (71) slidably mounted to an ejector bracket (73), that is attached to said dispenser channel, (ii) an elongated spring (75) affixed at a first end to a forward portion of said dispenser channel and on a second opposite end to a first end of said ejector rod, and (iii) an ejector pin formed on a second end of said ejector rod, said ejector pin adapted to extend from an ejector aperture in said dispenser channel, wherein said elongated spring is tensioned to cause the ejector pin to apply pressure to said hand-held telephone in a direction that urges said hand-held telephone out of said telephone-receiving cavity.

14. An armrest retainable apparatus for securing and selectively releasing a hand-held telephone, said apparatus comprising:
an elongated, multifaceted dispenser channel;
an outer cover affixed substantially over said dispenser channel;
a face plate secured to the outer cover at a first end of said outer cover;
a latch plate secured to an end of said dispenser channel so that said dispenser channel, said face plate, and said latch plate in cooperation define a telephone-receiving cavity, said face plate exhibiting a first vertical opening providing an access to said telephone-receiving cavity and a second vertical slot for the insertion of a credit card;
a latching mechanism pivotably mounted on said latch plate and extending into said dispenser channel;
retention means attached between said dispenser channel and said latching mechanism for pivotably orienting the latching mechanism; and
an ejector mechanism disposed on the dispenser channel and aligned with an ejector aperture in said dispenser channel for urging a hand-held telephone in a forward direction, out of the telephone-receiving cavity and through said face plate first opening.

15. An apparatus as defined in claim 14, wherein said latching mechanism comprises:
generally rectangular top and bottom major surfaces;
a first eyelet disposed transversely along said bottom major surface, said eyelet adapted to accept a pivot rod therein, pivotably affixing said latching mechanism to said latching plate;
a latch-release arm integrally joined and extending from said latching mechanism, said latch-release arm forming a slightly acute angle with said bottom major surface, said latch-release arm extending into said telephone receiving cavity and adapted to interlockingly engage a latch-receiving flange of said hand-held telephone.

16. An apparatus as defined in claim 15, wherein the retention means comprises:
an elongated coil spring affixed at a first end to said dispenser channel; and
a hamate portion integral to and extending at a second end of said coil spring, said hamate portion attached to said latching mechanism.

17. An apparatus as defined in claim 15, wherein said ejector mechanism consists essentially of (i) an ejector rod slidably mounted on a generally U-shaped ejector bracket, said ejector bracket attached to an exterior surface of said dispenser channel, (ii) an elongated spring affixed at a first end to a forward portion of said dispenser channel and affixed at a second end to a first end of said ejector rod, and (iii) an ejector pin formed on a second opposite end of said ejector rod, said ejector pin adapted to extend from an ejector aperture in said dispenser channel, wherein said elongated spring is tensioned to cause the ejector pin to apply pressure to said hand-held telephone in a direction that urges said hand-held telephone out of said telephone-receiving cavity and said face plate first opening.

18. An apparatus as defined in claim 17, wherein the latching mechanism comprises:
generally rectangular top and bottom major surfaces;
a first eyelet disposed transversely across said top major surface securing the first end of a latch-release rod therethrough;
a second eyelet disposed transversely across said bottom major surface, said second eyelet adapted to receive a pivot rod, pivotably affixing said latching mechanism to the said latching plate;
a latch-release arm integrally joined to and extending at a slightly acute angle from said bottom major surface; and,
said latch-release arm extending into said telephone-receiving cavity, to interlockingly engage a latch-receiving flange of said hand-held telephone.

19. An apparatus as defined on claim 18, wherein said latching mechanism further includes a latch-release actuator attached to said dispenser channel having a second opposite end of said latch-release rod affixed thereto, said latch release actuator located proximate said face plate second slot, said slot for permitting the insertion of a credit card in the direction of said latch-release actuator.

20. An apparatus as defined in claim 19, wherein said retention means comprises:
an elongated coil spring affixed at a first end to said dispenser channel; and
a hamate portion integral to and extending at a second end of the coil spring, said hamate portion attached to said latch-release rod proximate said first eyelet.

21. The apparatus as defined on claim 20, wherein the latching mechanism is operable, in response to said credit card being urged against said latch-release actuator, to pivot about said pivot rod, thereby disengaging said latching arm from said latch-receiving flange.

22. An apparatus as defined in claim 21, wherein responsive to the disengagement of said latching-arm from said latch-receiving flange, said ejector mechanism causes said ejector pin to apply pressure to said hand-held telephone in a direction that urges the said hand-held telephone out of said telephone-receiving cavity and through said face plate first opening.

23. For operation in conjunction with a hand-held telephone and with an armrest retainable dispenser for the telephone, a credit-card unlatching mechanism ("CCUM") comprising:
   a face plate disposed in proximity with the dispenser and providing a first opening for access to the hand-held telephone and a second opening for the insertion of a credit card;
   a pivotably mounted latching mechanism disposed rearwardly from said first and said second opening in said face plate and comprising a latching arm, said latching mechanism predisposed in a latching orientation with respect to said dispenser so that said latching arm is positioned to secure a hand-held telephone in said dispenser;
   a retention mechanism attached between said dispenser and said latching mechanism for predisposing said latching mechanism in the above-mentioned latching orientation; and
   a latch-release actuator interposed between said face plate second opening and said latching mechanism and mechanically connected to said latching mechanism, so that a credit card inserted through said second opening in the direction of said latch-release actuator and abutted against said latch-release actuator operates to cause a pivotal motion of said latching mechanism into an unlatching orientation, whereby said latching arm is positioned to permit the release of said hand-held telephone from said dispenser.

24. A CCUM as defined in claim 23, wherein said latching mechanism comprises (i) a major surface and (ii) a latch-release arm integrally joined to the major surface so as to form an acute angle with the major surface, said latch-release arm adapted to interlockingly engage a latch-release flange so as to secure said hand-held telephone in said dispenser.

25. A CCUM as defined in claim 24, wherein said retention mechanism comprises:
   an elongated coil spring affixed at one end to said dispenser; and
   a hamate portion integral to and extending at another end of the coil-spring, said hamate portion affixed to said latching mechanism.

26. A CCUM as defined in claim 25, wherein said dispenser further includes a credit-card-accepting cavity extending internally to said dispenser from said face plate second opening, said credit-card-accepting cavity providing an elongated compartment generally conformal to the profile of a credit card for guiding the travel of a credit card between said second opening and said latch-release actuator.

27. A CCUM as defined in claim 26, further comprising an ejector mechanism including resilient means disposed at a rearward area of said dispenser for urging, in response to the insertion of a credit card by a telephone user, a hand-held telephone in a direction out of said dispenser and said first opening.

28. An apparatus as defined in claim 27, wherein said ejector mechanism consists essentially of (i) an ejector rod slidably mounted on an ejector bracket, that is attached to said dispenser, (ii) an elongated spring affixed at a first end to a forward portion of said dispenser and at a second end to a first end of said ejector rod, and (iii) an ejector pin formed on a second opposite end of said ejector rod, said ejector pin adapted to extend from an ejector aperture in the dispenser, wherein the elongated spring is tensioned to cause the ejector pin to apply pressure to said hand-held telephone in a direction that urges the telephone out of said dispenser and through said first opening.

29. A CCUM as defined in claim 23, wherein said latching mechanism comprises:
   a first major surface to which a latch-release rod is affixed, said latch-release rod mechanically connected to said latch-release actuator, said first major surface having a generally rectangular perimeter;
   a latching arm integrally joined to a second major surface so as to form a right-to-slightly-acute angle with said second major surface; and
   a latching mechanism eyelet transversely disposed along a rear portion of said second major surface for pivotably affixing said latching mechanism to said dispenser.

30. A CCUM as defined in claim 29, wherein said dispenser further includes (i) a latch plate disposed rearwardly from said first opening, said latch plate including a central opening, and (ii) latching mechanism mounting means, said latching mechanism mounting means adapted to receive said latching mechanism eyelet, for pivotably mounting said latching mechanism to said latch plate with said latching arm extending substantially through said latch plate opening into said dispenser and said hand-held telephone.

* * * * *